US009372681B1

(12) United States Patent
Shevchenko et al.

(10) Patent No.: US 9,372,681 B1
(45) Date of Patent: Jun. 21, 2016

(54) REDIRECTION OF A DOCUMENT URL TO A NATIVELY-OPERATING APPLICATION

(71) Applicant: GOOGLE INC., Mountain View, CA (US)

(72) Inventors: Sergey Shevchenko, Mountain View, CA (US); Sriram Saroop, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/044,421

(22) Filed: Oct. 2, 2013

(51) Int. Cl.
*G06F 9/445* (2006.01)

(52) U.S. Cl.
CPC .......................................... *G06F 8/61* (2013.01)

(58) Field of Classification Search
CPC ....................................................... G06F 9/445
USPC ................................. 717/176–178, 168–173
See application file for complete search history.

(56) References Cited

U.S. PATENT DOCUMENTS

| 8,407,576 | B1 * | 3/2013 | Yin et al. ....................... 715/206 |
| 8,626,919 | B1 * | 1/2014 | Papakipos ............... H04L 67/10 709/226 |
| 2010/0070842 | A1 * | 3/2010 | Aymeloglu et al. ........... 715/207 |
| 2012/0060086 | A1 * | 3/2012 | Gundorov ..................... 715/235 |
| 2012/0233559 | A1 * | 9/2012 | Seo ..................... G06F 9/44526 715/760 |
| 2013/0054514 | A1 * | 2/2013 | Barrett-Kahn et al. ....... 707/608 |
| 2013/0097596 | A1 * | 4/2013 | Queru ................. G06F 9/44526 717/176 |
| 2014/0019958 | A1 * | 1/2014 | Sherman ....................... 717/178 |
| 2014/0317615 | A1 * | 10/2014 | Ma ............................ G06F 8/61 717/176 |
| 2014/0344801 | A1 * | 11/2014 | Jitkoff ..................... G06F 9/445 717/176 |

OTHER PUBLICATIONS

Non patent website : Creating an Auto-launch windows phone 8 Application using File and URI Associations by Vipul Patel [online], Jul. 2013, [retrieved on Jan. 6, 2015] retrieved from internet. <http://www.developercom/ws/creating-auto-launch-windows-phone-8-application-using-file-and-uri-associations.html>.*
Non Patent Website: The Pros and Cons of web-Based Operating System by Ronald Pacchiano [online], Aug. 2011, [retrieved on Jan. 5, 2015] retrieved from internet. <http://www.smallbusinesscomputing.com/biztools/article.php/3939126/the-pros-and-cones-of-web-based-operating-system.htm>.*
Non Patent Website: how web operating system work by Jonathan Strickland, [online], 1998-2015, [retrieved on Jan. 5, 2015] retrieved from internet. <http://computer.howstuffworks.com/web-operating-system.htm>.*
Non Patent Website: Opening a Window With JavaScript, [online], 1999-2012, [retrieved on Jan. 6, 2015] retrieved from internet. <http://www.javascripter.net/faq/openinga,htm>.*

(Continued)

*Primary Examiner* — Chat Do
*Assistant Examiner* — Jae Jeon
(74) *Attorney, Agent, or Firm* — Brake Hughes Bellermann LLP

(57) ABSTRACT

A method includes declaring, in a manifest of an application, a document URL type. The application is configured for native operation outside a web browser on a user's computing device and is coded to open a document corresponding to a document URL which conforms to the declared document URL type in the manifest. The method further includes providing the application for installation on the user's computing device.

28 Claims, 5 Drawing Sheets

(56) References Cited

OTHER PUBLICATIONS

Online Website: URL Patterns [online] 2004-2007 [retrieved on Jan. 6, 2015] retrieved from internet. <http://docs.roguewave.com/hydraexpress/3. 5. 0/html/rwsfservletug/4-3.htm>.*

Non Patent Website: URI associations in Windows Phone 8 [online] Jan. 2013 [retrieved Jan. 6, 2015], retrieved from internet. <http://www.geekchamp.com/articles/uri-associations-in-windows-phone-8>.*

Non patent website : creating an auto-launch windows phone 8 application using file and URI Associations by Patel, [online], Jul. 2013, [retrieved on Jan. 6, 2015] retrieved from internet <http://www.developer.com/ws/creating-auto-launch-windows-phone-8-application-using-file-and-uri-associations.html>.*

\* cited by examiner

310
DECLARING, IN A MANIFEST OF AN APPLICATION, A DOCUMENT URL TYPE, THE APPLICATION CONFIGURED FOR NATIVE OPERATION OUTSIDE A WEB BROWSER ON A USER'S COMPUTING DEVICE AND CODED TO OPEN A DOCUMENT CORRESPONDING TO A DOCUMENT URL WHICH CONFORMS TO THE DECLARED DOCUMENT URL TYPE

320
PUBLISHING OR PROVIDING THE APPLICATION FOR INSTALLATION ON THE USER'S COMPUTING DEVICE

330
CONFIGURING THE WEB BROWSER ON THE USER'S COMPUTING DEVICE TO TRACK THE DECLARATION IN THE MANIFEST OF THE APPLICATION OF THE CAPABILITY OF THE APPLICATION TO OPEN A DOCUMENT CORRESPONDING TO A DOCUMENT URL WHICH CONFORMS TO THE DECLARED DOCUMENT URL TYPE

340
CONFIGURING THE WEB BROWSER ON THE USER'S COMPUTING DEVICE TO MAINTAIN A REGISTRY OF DOCUMENT URLS TYPES ASSOCIATED WITH APPLICATIONS INSTALLED ON THE USER'S COMPUTING DEVICE, WHERE THE DOCUMENT URLS TYPES REPRESENT TYPES OF DOCUMENT URLS THAT THE APPLICATIONS ARE CODED TO OPEN OR PROCESS

350
CONFIGURING THE WEB BROWSER ON THE USER'S COMPUTING DEVICE TO DETERMINE, IN RESPONSE TO A NAVIGATION EVENT ON THE USER'S COMPUTING DEVICE WHICH LEADS TO A NAVIGATED-TO-DOCUMENT URL, IF THE NAVIGATED-TO-DOCUMENT URL CONFORMS TO THE DECLARED DOCUMENT URL TYPE IN THE MANIFEST OF THE APPLICATION AND ACCORDINGLY REDIRECT THE NAVIGATED-TO-DOCUMENT URL TO THE APPLICATION FOR OPENING A DOCUMENT ASSOCIATED WITH THE NAVIGATED-TO-DOCUMENT URL

360
CONFIGURING THE WEB BROWSER TO AWAKEN OR LAUNCH THE APPLICATION ON THE USER'S COMPUTING DEVICE

REDIRECTION OF A DOCUMENT URL TO A NATIVELY-OPERATING APPLICATION

TECHNICAL FIELD

This disclosure generally relates to applications for cloud computing devices.

BACKGROUND

Cloud or network-based computing is a type of computing that relies on sharing computing resources rather than having local servers or personal devices to handle applications. Different services or resources (e.g., servers, storage and applications) can be delivered to a user via a web browser. A user may have one or more accounts with cloud- or network-service providers to utilize different cloud or network-based services and resources.

Generally, a web application ("web app") is a program that is written in, for example, HTML5, JavaScript, and CSS, and is designed to be run entirely within a web browser on a user's computing device. Google Docs and Gmail are examples of cloud- or network-based web apps that are used or run entirely within a web browser tab.

A web app that can run entirely within the web browser may be either a "hosted web app" or a "packaged web app." A hosted web app may be, for example, hosted on the Internet or other network, available as a URL, and accessed by users using a web browser. The hosted web app's components on the Internet may include, for example, a portion of a web site that itself may include one or more web pages and possibly some metadata that may be pertinent to a functionality of the web app. In contrast to the hosted web app, a packaged web app may be thought of as a web app all of whose components are bundled in a package that can be downloaded (e.g., from a public or private app store) for local execution by the browser on the user's computing device. A packaged web app may be executed even when the user's computing device is offline i.e. without access to a network or the Internet.

Furthermore, "native" or "natively-operating" apps are apps that are developed to operate in their own application containers outside of a web browser on the user's computing device. A natively-operating app may interact with and take advantage of operating system features and other software that may be typically installed on user's computing device but are not available to web apps.

Like a packaged web app, a natively-operating app may also be bundled in a package that can be downloaded (e.g., from a public or private app store) for local installation and execution on the user's computing device. The packaged natively-operating app, like a packaged web app, may also be written in HTML5, JavaScript, and CSS. Both kinds of packaged apps can load the same type of content: HTML documents with CSS and JavaScript. However, in contrast to the within-browser operation of a packaged web app (or a hosted web app), a packaged natively-operating app is designed to be installed on the user's computing device and run outside of a browser tab directly from the computing device's hard drive.

Usually, a user can invoke or launch a web app to handle or process an object directly in a web browser by clicking on a URL or link, which is attached to the web app. For example, a user may open a text document using a web-based text processing application by clicking on a link associated with the text document in the web browser. Further, for example, a user may launch a web-based e-mail application (e.g., gmail) by clicking on a URL for a web site (e.g., gmail.com) associated with the application. However, a packaged natively-operating app installed on a user's machine may not be similarly invoked or launched directly in a web browser or from a web site; the packaged natively-operating app by default operates outside the web browser and there is no URL attached to or associated with the packaged natively-operating app.

A need exists for launching packaged natively-operating apps installed on a user's computing device to handle or process documents, files or objects. In particular, a need exists for launching a natively-operating app from a web browser, web-site, other web feature (e.g., URL link), or another natively-operating app.

SUMMARY

For convenience in description and consistent with an evolving use of terms in the industry, the term "a packaged app" as used herein, in appropriate context, may be understood to refer to "a packaged natively-operating app" operating outside a web browser and not to "a packaged web app" operating inside a web browser.

A packaged app, which may be coded to open or process a specific type of documents, may be installed on a user's computing device. The user's computing device may be generally configured for interacting with or processing "online" resources (e.g., cloud- or network-based services, data, applications, storage, etc.) that are identified by URLs and available on the web. In contrast, the packaged application, which by default operates outside of a web browser, may be an off-line resource that cannot be accessed by navigating to a URL directly on the web. However, the packaged application may still be utilized to open or process documents on the web. A web browser on the user's computing device may determine that the packaged application is capable of opening or processing a document at a navigated-to-URL, and accordingly redirect the document URL to the packaged application for processing. The web browser may select the packaged application for redirection based on a declaration in a manifest of the packaged application of the packaged application's capability to open or process the specific type of documents.

In a general aspect, a non-transitory computer-readable storage medium includes instructions stored thereon, which instructions, when executed by one or more microprocessors, cause a computer system to provide an application for installation on a user's computing device. The application is configured for native operation outside a web browser on a user's computing device and coded to open a document corresponding to a document URL which conforms to a specific document URL type. A manifest of the application declares the specific document URL type for which the application is coded to open the corresponding document. The application may be coded to open documents corresponding to document URLs which conform to more than one specific document URL types. The manifest of the application may accordingly declare the several specific document URL types which the application can handle or process.

In a general aspect, a non-transitory computer-readable storage medium has instructions stored thereon, which instructions when executed by one or more microprocessors cause a user's computing device to register a capability of an application installed on the user's computing device to process document URLs of a specific type. The application is configured for native operation outside of a web browser on the user's computing device. If a navigation event on the user's computing device leads to a navigated-to-document URL that is of the specific type of document URLs registered to the application on the user's computing device, the web browser redirects the navigated-to-document URL to the application and launches the application on the user's computing device to open the document corresponding to the navigated-to-document URL.

According to one general aspect, a method includes declaring, in a manifest of an application (e.g., a packaged app), a document URL type. The application may be configured for native operation outside a web browser on a user's computing device and may be coded to open a document corresponding to a document URL which conforms to the document URL type declared in the manifest. The method may further include publishing or providing the application for installation on the user's computing device.

In an aspect, the method may include configuring the web browser on the user's computing device to track the declaration in the manifest of the application of the capability of the application to open a document corresponding to a document URL which conforms to the declared document URL type.

In another aspect, the method may include configuring the web browser on the user's computing device to track the declaration in the manifest of the application of the capability of the application to open a document corresponding to a document URL which conforms to the declared document URL type.

In another aspect, the method may include configuring the web browser on the user's computing device to maintain a registry (e.g., a table) of document URLs types associated with applications installed on the user's computing device, where the document URLs types represent types of document URLs that the applications are coded to open or process.

A navigation event on the user's computing device or web browser, which leads to a navigated-to-document URL (e.g., a web page or web site), may include any one of (1) a direct click by a user on a link in a web page or other document, (2) a script-driven navigation event, (3) a direct URL entry in the web browser's address bar, (4) a form submission from a web page, and (5) any action directly or indirectly initiated by the user that leads to a navigation to a URL within the web browser.

In an aspect, with respect to opening documents or other web resources, the method may include configuring the web browser on the user's computing device to respond to a navigation event by determining if the navigated-to-document URL conforms to the declared document URL type in the manifest of the application, and accordingly redirect the navigated-to-document URL to the application for opening a document associated with the navigated-to-document URL. The method further includes configuring the web browser to awaken or launch the application on the user's computing device.

In a general aspect, a method includes registering a capability of an application installed on the user's computing device to process document URLs of a specific type. The application may be configured for native operation outside of a web browser on the user's computing device.

A navigation event on the user's computing device may lead to a navigated-to-document URL that is of the specific type of document URLs registered to the application on the user's computing device. In an aspect, the method includes redirecting the navigated-to-document URL to the application and launching the application on the user's computing device to open the document corresponding to the navigated-to-document URL.

The details of one or more implementations are set forth in the accompanying drawings and the description below. Other features will be apparent from the description and drawings, and from the claims.

BRIEF DESCRIPTION OF THE DRAWINGS

FIG. 3 is a flow diagram which illustrates an example method for opening or processing resources (e.g., documents) that may be hosted on the web and may be identified by document URLs, in accordance with the principles of the disclosure herein.

Like reference symbols in the various drawings indicate like elements.

DETAILED DESCRIPTION

Figure 1:
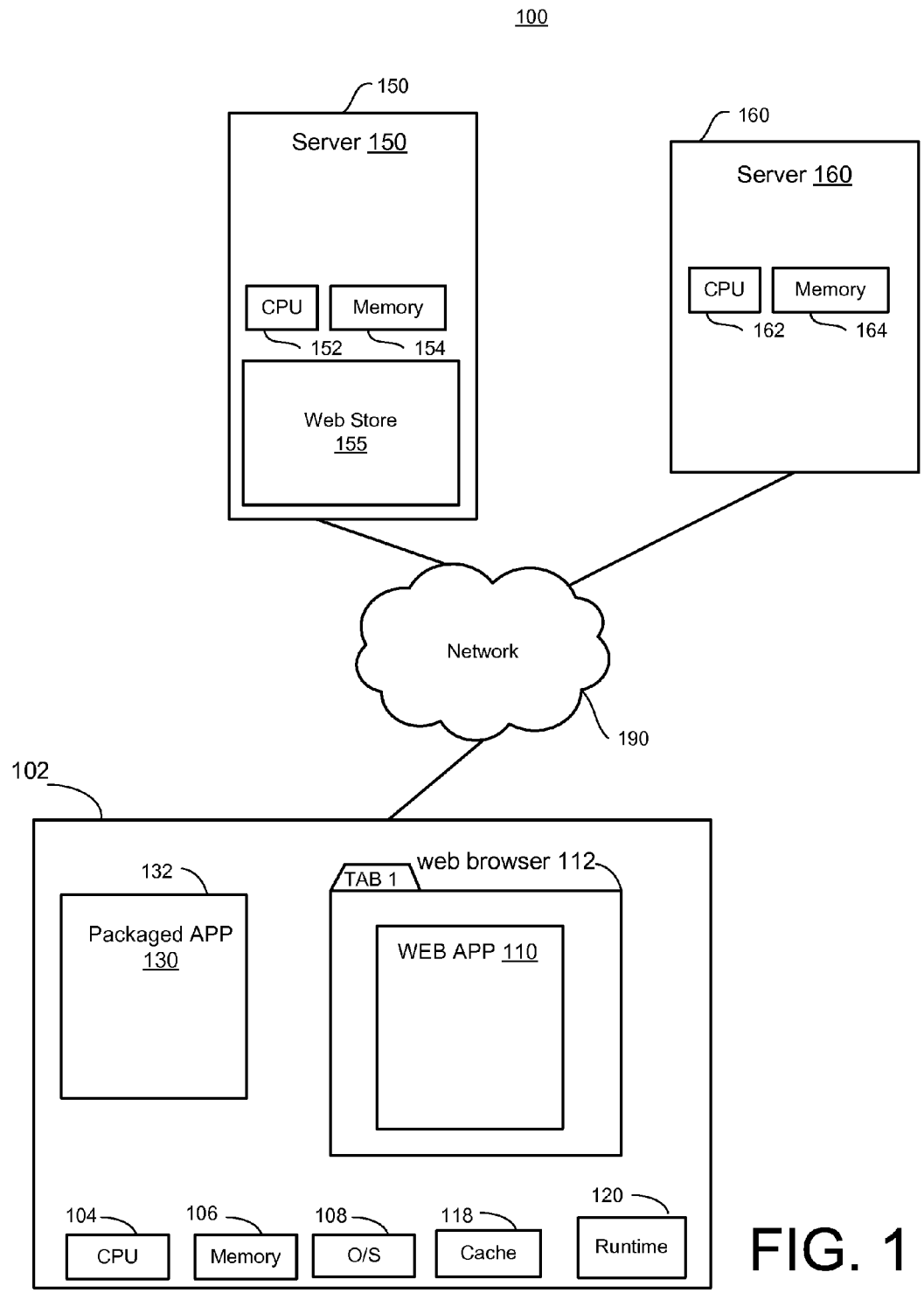
FIG. 1 is a schematic block diagram illustrating an example system 100 that may be configured to provide redirection of document links or URLs to launch a packaged application on a user's computing device, in accordance with the principles of the disclosure herein.

Packaged natively-operating apps ("packaged apps") may deliver an experience as capable as a native app, but as safe as a web page. Just like web-hosted apps, packaged apps may be written in HTML5, JavaScript, and CSS. Packaged apps may look and behave like native apps, and may have native-like capabilities that may be much more powerful than those available to web apps.

The packaged apps described herein may be cross-platform apps that can be installed and run on different computing devices having different computing platforms. The packaged apps may be published or provided by a public or private app store (e.g., a Chrome Web Store (CWS)). Packaged apps published by CWS may be referred to as packaged chrome apps even if they can run on computing platforms or operating systems other than the Chrome platform or operating system.

Documents, files, or objects ("documents") of interest to users may be web objects of types that are usually opened or processed by the user using a web browser to navigate to the document location, for example, by clicking on a web link (e.g., a URL link). The user may, for example, receive a web link to a particular document in an e-mail or other document. The user may click on the received web link to navigate to the document location (e.g., a web page or web site) on the web where the document may be opened by the web browser using an associated web app. As an example of a text-processing web app, the user may receive a web link to a text document in an e-mail or other document. When the user clicks on the web link, the web browser on the user's computing device may navigate to the URL corresponding to the text document and automatically open the text document with the associated text-processing web app.

A packaged app installed on a user's computing device, like a web app, may be coded to process a specific type or types of documents, files, or objects ("documents"). A particular document may be represented or exposed by a link, a document URL or a website on the web. A web browser on the user's computing device, on which the packaged application is installed, may be configured to recognize that the user's computing device has the packaged app installed on it for processing the specific type or types of documents. Further, the web browser may be configured so that navigation (e.g., a user click on a link or URL) to the particular document URL does not cause the web browser to open the document at the navigated-to-document URL, but instead causes the web browser to redirect the navigated-to-document URL to the packaged app installed on the user's computing device, in accordance with the principles of the disclosure herein. Instead of the web browser itself opening or processing the particular document, the web browser may awaken or launch packaged app to open or process the particular document.

A registration scheme may be employed to allow a packaged app installed on a user's computing device to declare its ability or intent to handle or process one or more types of links or URL patterns, in accordance with the principles of the disclosure herein. In an example registration scheme, a first party packaged app may be able to self-register (e.g., with a public or private app store) its capability for handling or processing URL patterns that the first party can prove ownership of.

A packaged app may include permissions or rules that declare its ability or intent to handle or process particular types of links or URL patterns in an app manifest or header file of the app, in accordance with the principles of the disclosure herein. A browser on the user's computing device may be configured to recognize the permissions or rules in the manifest or header file of the packaged app installed on the user's computing device. The browser may further, for example, maintain a registration table associating the packaged app with the one or more types of links or URL patterns that the packaged app is coded to handle or process. When a user clicks on a link or URL matching one of the types of links or URL patterns registered by the packaged app, the browser may launch the packaged app, and pass or redirect the user-clicked URL to the packaged app for handling or processing.

FIG. 1 is a schematic block diagram of an example system 100 that may be configured to provide redirection of document links or URLs to launch a packaged application on a user's computing device, in accordance with the principles of the disclosure herein. In various implementations, system 100 may include one or more computing devices 102 (e.g., desktop computers, notebook computers, netbook computers, tablet computers, smart-phones, etc.). A computing device 102 may include one or more processors (e.g., CPU 104), one or more memories (e.g., memory 106), an operating system (e.g., O/S 108), and a cache (e.g., cache 118). O/S 108 may, for example, be the Chrome operating system, which is a web-based operating system. Computing device 102 may execute a runtime 120 and various applications (e.g., a web-hosted application 110, a packaged application 130, etc.). Web-hosted application 110 may run in a tab of web browser 112, which may be provided by O/S 108. In contrast, packaged application 130, which may installed on a hard drive or memory of computing device 102, may run outside of any web browser in its own application container 132.

Computing device 102 may be linked via a network 190 to one or more web servers (e.g., server 150 and server 160, etc.). Server 150 and server 160 may each include one or more CPUs and memories (e.g., CPU 152/Memory 154, and CPU 162/Memory 164, respectively). Each of the servers may, for example, be configured to deliver various web content (e.g., web pages, data storage, applications, etc.) to computing devices (e.g., computing device 102) via network 190. Server 150 may, for example, include a web store 155 (e.g., a Chrome Web Store (CWS)). Web store 155 may be a web store which publishes or otherwise makes available applications (e.g. packaged application 130) for downloading and installation on users' computing devices.

Packaged application 130, which may be a first party app, may be coded to handle specific types or patterns of URL links. Packaged application 130 may self-register (e.g., with web store 155) its capability to handle the particular types or patterns of URL links.

In example registration schemes of the present disclosure, a URL type that packaged application 130 can handle or process may be defined as a URL glob pattern. For registration, the URL glob pattern may be required to have at least a complete domain. Domain ownership may be verified by web store 155 (e.g., CWS) before allowing the app to be published. Further, in the example registration schemes only certain URL schemes (e.g., "http://" and "https://" URL schemes) may be supported.

Application Registration

As an example of the registration scheme of the present disclosure, packaged application 130 (e.g., GDocs) may self-register for handling one or more URL type(s) through its manifest using, for example, an "url_handlers" key. An example permissions or rules declaration in the manifest file of packaged application 130 may be as follows:

"url_handlers": {
"Excel": {
"matches": ["https://docs.google.com/file/*"],
"title": "Open Excel document in GDocs"
},
"GSheets": {
"matches": ["https://docs.google.com/spreadsheet/*"],
"title": "Open GSheets document in GDocs"
}
}.

According to the foregoing manifest, packaged application 130, which may be a text processing application (e.g., GDocs) may register to handle or process any document that has a URL conforming to an "Excel" type pattern: https://docs.google.com/file/*, or a URL conforming to a "GSheets" type pattern: https://docs.google.com/spreadsheet/*. In case packaged application 130 is a first party application, web store 155 may confirm common authorship or ownership of packaged application 130 (e.g., Gdocs) and the to-be-registered URL patterns (e.g., the Excel and GSheets types of patterns) before publishing or making packaged application 130 available for installation on users' computing devices.

Published packaged application 130 (e.g., GDocs) with its URL registrations may be downloaded from web store 155 to user's computing device 102. Web browser 112 on the user's computing device may keep track of the URL patterns registered by all packaged applications (including packaged application 130) installed on the user's computing device, for example, in a "registration" table (e.g., table 116, FIG. 2). Referencing the registration table, web browser 112 may redirect a navigation (e.g., a user's click) to a link or URL of a registered type to a matching packaged application for processing.

It may be expected that there will be no URL-registration conflicts in table 116 between multiple packaged applications installed on the user's computing device registering a same URL pattern or type. Usually at most one app (e.g., packaged app 130) may be expected to register or match a URL pattern or type (e.g., document.url.com/*) because a first party app and the document web site may be controlled by the same first party or author. However, there can still be a URL-registration conflict, for example, because two or more packaged apps by the same author or party can register a same URL pattern or type. To handle such a case, web browser 12 may be configured to recognize an error and display, for example, a dialog screen offering a choice of the two or more packaged applications for the user to select for opening and processing the document at a matching navigated-to-URL. Web browser 12 may be further configured to record the user's choice or selection to resolve future occurrences of the URL-registration conflict and/or to continue to offer the dialog screen each time the URL-registration conflict occurs.

Example system 100 described above with reference to FIG. 1 may be used for redirection of document links or URLs to a packaged application both when the user's computing device is online (i.e. connected to the Internet, for example, via network 190) and when the user's computing device is offline.

Packaged Application Selection and Launching when User is Online

Figure 2:
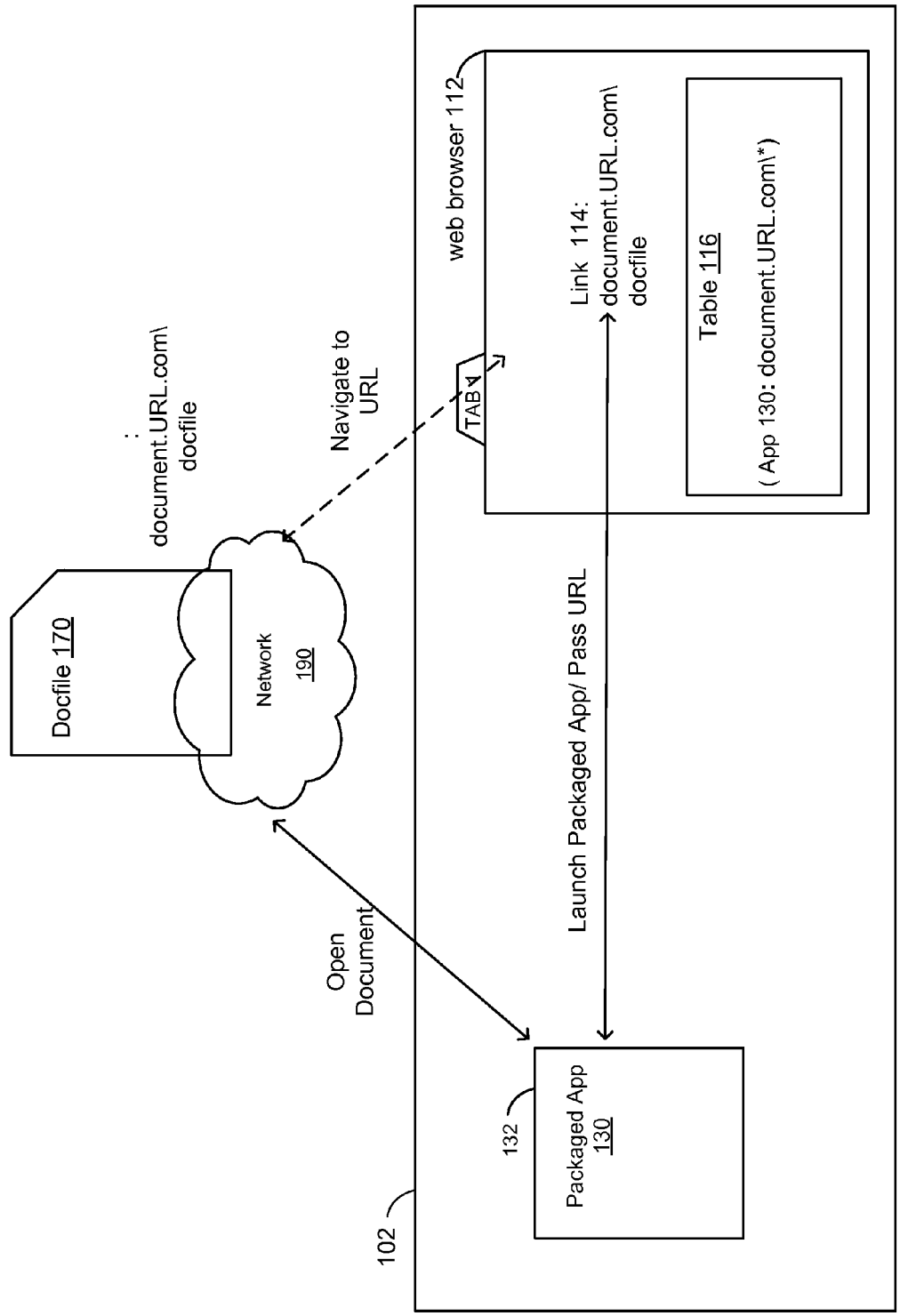
FIG. 2 is a schematic illustration of an example online scenario 200 in which instead of a web browser on a user's computing device opening a document hosted at a document URL or website by a hosting service, a packaged application installed on the user's computing device is launched to open or process the document, in accordance with the principles of the disclosure herein.

FIG. 2 schematically shows an example online scenario 200 in which instead of a web browser opening a document hosted at a document URL or website by a hosting service, a packaged application installed on the user's computing device is launched to open or process the document, in accordance with the principles of the disclosure herein.

In the example online scenario, web browser 112 may navigate to a document URL (e.g., document.url.com/docfile), for example, in response to a navigation event such as a direct click by a user on a link (e.g., link 114) or in response to a script-driven (e.g., via a "window.open( )" method) navigation event. The navigated-to-document URL (e.g., document.url.com/docfile) may be of a type (e.g., document.url.com/*) registered by the packaged application (e.g., packaged application 130) installed on the user's computing device. Web browser 112 on the user's computing device may maintain a table 116 of the URL types and patterns registered by any or all packaged applications installed on the user's computing device. Table 116 may, for example, have an entry "App 130: document.url.com/*", which indicates that the URL type "document.url.com/*" is registered to packaged application 130.

In response to the navigation event on the user's computing device leading to a navigated-to-document URL, web browser 112 may determine from table 116 entries that the document URL is of a type registered to packaged application 130. Instead of opening the document web site in a browser tab, web browser 112 may launch packaged app 130 installed on the user's computing device to open or process the document. Web browser 112 may pass the navigated-to-document URL to the launched packaged app 130. Then, packaged app 130 may access the document URL to open and process the document (e.g., docfile 170) from the document web site hosted by the hosting service.

In the user's computing device (which, for example, may have a Chrome operating system), web browser 112 may launch or wake up packaged application 130 by using an API available in the specific app runtime environment, and passing the URL and other attributes of the navigation to the application.

Packaged application 130 may be coded to use the URL passed or redirected to it to extract the document from the URL, or web site for further processing. In an example implementation, packaged application may be coded to open a byte-stream to the document (e.g., docfile 170). Alternatively or additionally, packaged application 130 may be coded to use the redirected URL as a unique ID to extract the document from a local cache (e.g., cache 118) if the document has been previously cached there. Packaged application 130 may also be additionally coded to communicate with the document's hosting service using the redirected URL as a unique document ID.

In general, a web hosting service may use a Simple Object Access Protocol (SOAP) or a Representational State Transfer (REST) architectural style for interfacing to the web with web services. For simplicity or security, and to avoid potential abuse, packaged application 130 may be coded to communicate only with a hosting service that exposes its resources to the web in a RESTful manner, without relying on any non-RESTful or SOAP mechanisms such as cookies. Further, web browser 112 may not provide any information about accounts that the user of the computing device may be concurrently logged in to, and the document URL may not include any user authentication information. Accordingly, packaged application 130 may be coded to use a security-token protocol (e.g., OAuth 2.0 protocol) based identity API (e.g., Chrome Identity API) to authenticate a user if accessing the document requires authentication of user login.

Packaged Application Selection and Launching when User is Offline

A packaged application by default may operate offline. In an example scenario in which the user is offline, neither web browser 112 nor packaged app 130 can access a document hosted on the web. However, even if the user is offline, packaged app 130 may still be able to access and process web-based documents that have been previously cached locally.

In the offline scenario, web browser 112 may, for example, redirect a document URL to a packaged application in the same or similar manner as in the example online scenario 200 described above. Web browser 112 may first determine from table 116 that the document URL is of a type registered to packaged application 130. Web browser 112 may launch packaged application 130 as in the online scenario and then pass the document URL to the packaged app 130. Packaged app 130 may use the document URL as a document ID to attempt retrieve the document (e.g., docfile 170) from a cache (e.g., cache 118) where the document may have been previously cached. If the document is not found or cannot be opened, packaged app 130 may directly so inform the user on the user's computing device without any involvement of web browser 112.

FIG. 3 is a flow diagram which illustrates an example method 300 for opening or processing resources (e.g., documents) that may be hosted on the web and may be identified by document URLs. Instead of using a web browser to open or process user-selected or navigated-to-documents, the navigated-to-documents may be opened or processed by packaged applications, which may be installed for native operation outside the web browser on a user's computing device.

Method 300 includes declaring, in a manifest of an application, a document URL type (310). The application may be configured for native operation outside a web browser on a user's computing device and may be coded to open a document corresponding to a document URL which conforms to the declared document URL type. Method 300 may further include publishing or providing the application for installation on the user's computing device (320).

Method 300 may also include configuring the web browser on the user's computing device to track the declaration in the manifest of the application of the capability of the application to open a document corresponding to a document URL which conforms to the declared document URL type (330) and configuring the web browser on the user's computing device to maintain a registry (e.g., a table) of document URLs types associated with applications installed on the user's computing device, where the document URLs types represent types of document URLs that the applications are coded to open or process (340).

With respect to opening documents or other web resources, method 300 may include configuring the web browser on the user's computing device to: in response to a navigation event on the user's computing device which leads to a navigated-to-document URL, determine if the navigated-to-document URL conforms to the declared document URL type in the manifest of the application and accordingly redirect the navigated-to-document URL to the application for opening a document associated with the navigated-to-document URL (350). The navigation event may include any one of (1) a direct click by a user on a link in a web page or other document, and (2) a script-driven navigation event. Further, configuring the web browser to redirect the navigated-to-document URL to the application 340 may include configuring the web browser to awaken or launch the application on the user's computing device (360).

Figure 4:
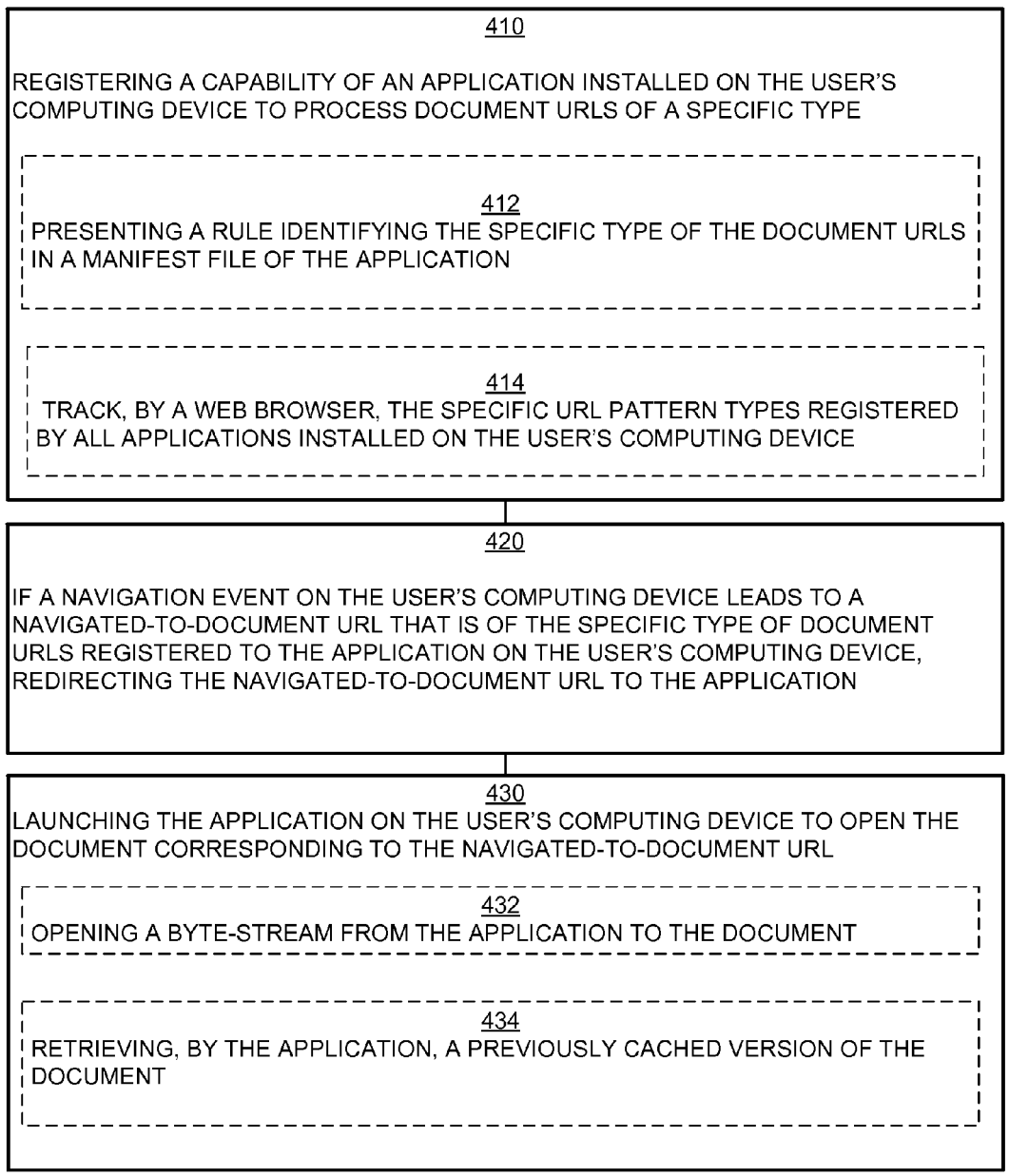
FIG. 4 is a flow diagram which illustrates another example method for opening a document from a user's computing device, in accordance with the principles of the disclosure herein.

FIG. 4 is a flow diagram which illustrates another example method 400 for opening a document from a user's computing device. The document may correspond to a document URL. Like in method 300, in method 400 instead of using a web browser to open or process user-selected or navigated-to-documents, the documents may be opened or processed by an application, which may be installed for native operation on a user's computing device outside the web browser.

Method 400 includes registering a capability of an application installed on the user's computing device to process document URLs of a specific type (410). The application may be configured for native operation outside of a web browser on the user's computing device. If a navigation event on the user's computing device leads to a navigated-to-document URL that is of the specific type of document URLs registered to the application on the user's computing device, method 400 includes redirecting the navigated-to-document URL to the application (420), and launching the application on the user's computing device to open the document corresponding to the navigated-to-document URL (430). The navigation event, which leads to a navigated-to-document URL may be a direct click by a user on a link in a web page or other document, or a script-driven navigation event. Other sources of the navigation event may include a bookmark, a browsing history entry, a shortcut on a new tab page or other features of the web browser.

In method 400, registering a capability of an application installed on the user's computing device to process document URLs of a specific type 410 may include presenting a rule identifying the specific type of the document URLs in a manifest file of the application (412). The specific type of the document URLs may be identified as a URL glob pattern in the manifest file. In example implementations, the URL glob pattern may include or be restricted to only "http://" and/or "https://" URL schemes.

Registering a capability of an application installed on the user's computing device to process document URLs of a specific type 410 may include keeping track, by a web browser, of the specific URL pattern types registered by all applications installed on the user's computing device (414).

Further, in method 400, launching the application on the user's computing device to open the document corresponding to the navigated-to-document URL 430 may include opening a byte-stream from the application to the document (432). Launching the application on the user's computing device to open the document corresponding to the navigated-to-document URL 430 may additionally or alternatively include retrieving, by the application, a previously cached version of the document (434).

From a perspective of the application installed on the user's computing device, methods 300 and 400 may include receiving a redirect of the navigated-to-document URL identified as being of a particular type or pattern registered by the application and opening by the application of the document associated with the navigated-to-document URL (330). The application may access the document at the URL where it is hosted on the web or may retrieve the document from a cache where the document may have been previously cached.

The navigated-to-document URL received by the application may have been navigated to or opened as a website page in a web browser tab by a direct user click on a URL link or, alternatively, by script-driven navigation from a web page or other document. In some scenarios, another application ("source application") may be a source of a document URL that may be redirected by method 300 or method 400 to the packaged app. For example, an event in the source application (e.g., a link exposed as an element of the source application's user interface (UI)) may initiate an internal navigation to a document URL, which would ordinarily open a browser tab. With methods 300 and 400, the internally-navigated-to-document URL may be subject to potential redirection from the source application to the application (e.g., if the internally-navigated-to-document URL is of the type registered to the application). The application may be launched to process the internally-navigated-to-document URL transparently, possibly without direct involvement or knowledge of the source application of the launch.

In some situations, multiple packaged applications installed on the user's computing device may have registered as being capable of processing or handling a same specific type of document URL. In such situations, a navigation event on the user's computing device may lead to a navigated-to-document URL that is of the specific type of document URL registered to the multiple packaged applications. Theoretically, any of the multiple packaged applications may be launched to process the navigated-to-document URL. To avoid conflict, methods 300 and 400 may include presenting a selection dialog (e.g., as a pop-up window on the computing device UI) by which the user may select which of the multiple packaged applications should be launched to process the navigated-to-document URL. The selection dialog may be configured to optionally record the user's selection as being effective for future conflicts so that the selection dialog does not have to be presented each time there is a similar conflict between the multiple packaged applications which have registered the same specific type of document URL. However, methods 300 and 400 may include presenting the selection dialog to the user again if there is a new or additional packaged application that has registered the same specific type of document URL as the multiple packaged applications.

A computer system (e.g., system 100) may be deployed to implement method 300 and/or method 400 in conjunction with a non-transitory computer-readable storage medium having instructions stored thereon. The instructions when executed by one or more microprocessors may cause the computer system to implement method 300 or method 400 as described with reference to FIGS. 3 and 4, respectively.

Figure 5:
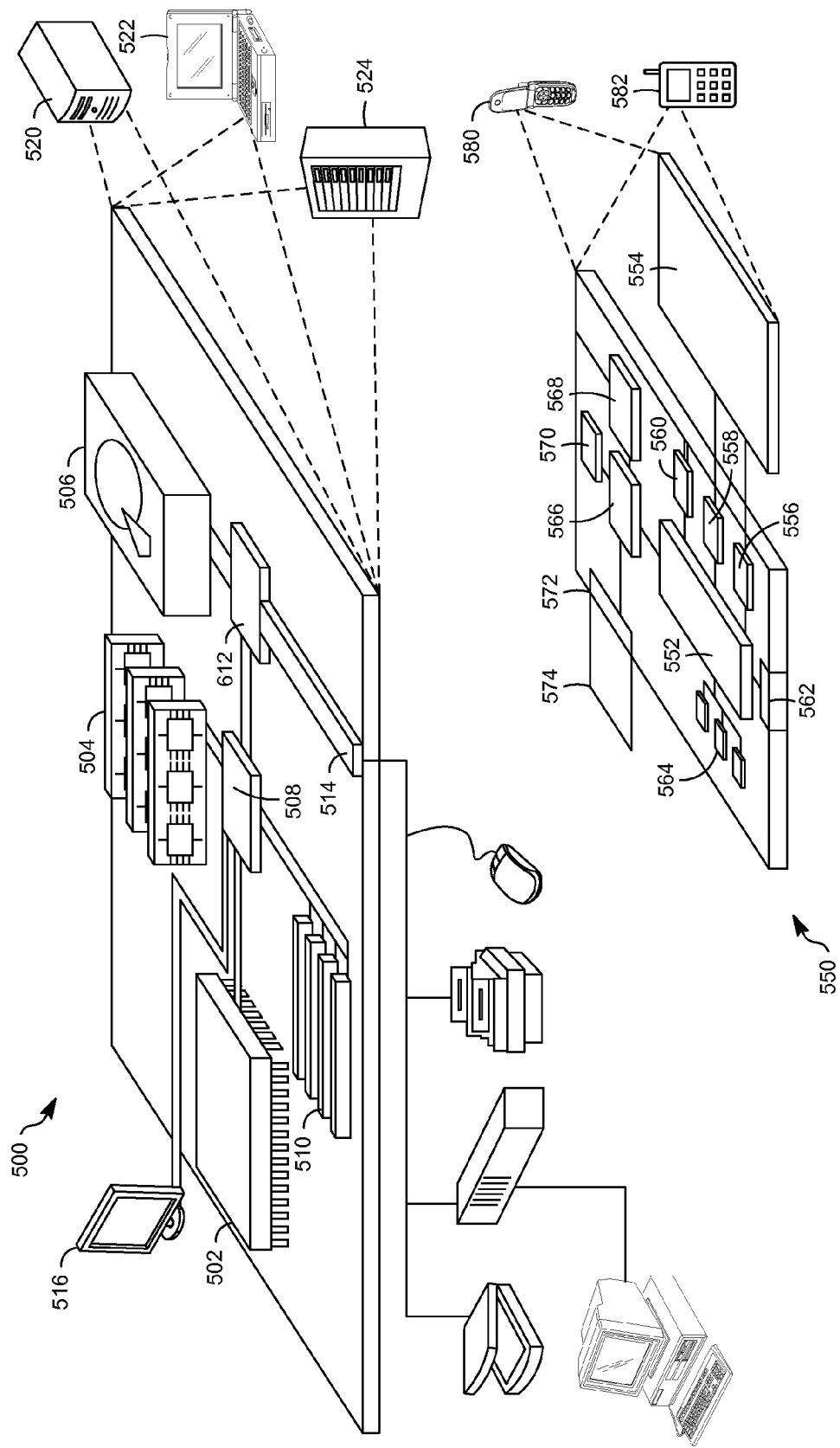
FIG. 5 is a schematic illustration of a generic computer device and a generic mobile computer device, which may be used with the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    providing a web browser on a user's computing device to track a declaration of a document URL type in a manifest of a first application of the capability of the first application to open a document corresponding to a document URL which conforms to the declared document URL type,
    wherein the first application is configured for native operation outside the web browser on the user's computing device and is coded to open the document corresponding to the document URL which conforms to the declared document URL type;
    configuring the web browser to maintain a registry of document URL types associated with applications including the first application installed on the user's computing device, the document URL types representing types of document URLs that the applications are coded to open or process, the registry of document URLs types being maintained as a table of the declared document URL types registered by the applications;
    configuring the web browser to present a selection dialog when the user clicks on a link or URL matching the document URL type declared in the manifest of the first application, the selection dialog permitting the user to select whether the first application should be launched outside the web browser to process the user-clicked link or URL to open the document; and
    configuring the web browser to, based on the user selection in the selection dialog, launch the first application outside the web browser, and to pass or redirect the user-clicked link or URL to the launched first application.

2. The method of claim 1, further comprising:
configuring the web browser on the user's computing device to:
in response to a navigation event on the user's computing device which leads to a navigated-to-document URL, determine if the navigated-to-document URL conforms to the declared document URL type in the manifest of the application and accordingly redirect the navigated-to-document URL to the application for opening a document associated with the navigated-to-document URL.

3. The method of claim 2, wherein configuring the web browser on the user's computing device to redirect the navigated-to-document URL to the application includes configuring the web browser to launch the application.

4. The method of claim 2, wherein the navigation event includes any one of (1) a direct click by a user on a link in a web page or other document and (2) a script-driven navigation event.

5. A non-transitory computer-readable storage medium having instructions stored thereon, which instructions when executed by one or more microprocessors cause a computer system to:
provide a web browser on a user's computing device to track a declaration of a document URL type in a manifest of a first application of the capability of the first application to open a document corresponding to a document URL which conforms to the declared document URL type,
wherein the first application is installed for native operation outside the web browser on the user's computing device and is coded to open the document corresponding to a document URL which conforms to the document URL type that is declared in the manifest of the first application;
configure the web browser to maintain a registry of document URL types associated with applications including the first application installed on the user's computing device, the document URL types representing types of document URLs that the applications are coded to open or process, the registry of document URLs types being maintained as a table of the declared document URL types registered by the applications;
configure the web browser to present a selection dialog when the user clicks on a link or URL matching the document URL type declared in the manifest of the first application, the selection dialog permitting the user to select whether the first application should be launched outside the web browser to process the user-clicked link or URL to open the document; and
configure the web browser to, based on the user selection in the selection dialog, launch the first application outside the web browser, and to pass or redirect the user-clicked link or URL to the launched first application.

6. The non-transitory computer-readable storage medium claim 5, wherein the instructions when executed by one or more microprocessors further configure the web browser on the user's computing device to:
in response to a navigation event on the user's computing device which leads to a navigated-to-document URL, determine if the navigated-to-document URL conforms to the declared document URL type in the manifest of the application and accordingly redirect the navigated-to-document URL to the application installed for opening a document associated with the navigated-to-document URL.

7. The non-transitory computer-readable storage medium of claim 6, wherein configuring the web browser on the user's computing device to the navigated-to-document URL to the application includes configuring the web browser to launch the application.

8. The non-transitory computer-readable storage medium of claim 6, wherein the navigation event includes any one of (1) a direct click by a user on a link in a web page or other document and (2) a script-driven navigation event.

9. A method for opening a document from a user's computing device, the document corresponding to a document URL, the method comprising:
registering a capability of a first application installed on the user's computing device to process document URLs of a specific type, the first application configured for native operation outside of a web browser on the user's computing device, wherein the web browser on a user's computing device tracks a declaration of a document URL type in a manifest of the first application of the capability of the first application to open a document corresponding to a document URL which conforms to the declared document URL type, and
wherein the web browser maintains a registry of document URL types associated with applications including the first application installed on the user's computing device, the document URL types representing types of document URLs that the applications are coded to open or process, the registry of document URLs types being maintained as a table of the declared document URL types registered by the applications;
when a navigation event on the user's computing device leads to a navigated-to-document URL that is of the specific type of document URLs registered to the first application on the user's computing device,
presenting a selection dialog permitting the user to select whether the first application should be launched outside the web browser to process the navigated-to-document URL to open the document; and
based on a user selection in the selection dialog, redirecting the navigated-to-document URL to the first application and
launching the first application on the user's computing device to open the document corresponding to the navigated-to-document URL by one of using the navigated-to-document URL redirected to the packaged first application to extract the document from the navigated-to-document URL and using the redirected URL as a unique ID to extract the document from a local cache.

10. The method of claim 9, wherein registering a capability of an application installed on the user's computing device to process document URLs of a specific type includes presenting a rule identifying the specific type of the document URLs in a manifest file of the application.

11. The method of claim 10, wherein presenting a rule identifying the specific type of the document URLs in a manifest file of the application includes identifying the specific type of the document URLs as a URL glob pattern.

12. The method of claim 11, wherein the URL glob pattern includes at most "http://" and "https://" URL schemes.

13. The method of claim 9, wherein registering a capability of an application installed on the user's computing device to process document URLs of a specific type includes keeping track, by a web browser, of the specific URL pattern types registered by all applications installed on the user's computing device.

14. The method of claim 9, wherein the navigation event is a direct click by a user on a link in a web page or other document.

15. The method of claim 9, wherein the navigation event is a script-driven navigation event.

16. The method of claim 9, wherein a source of the navigation event is a one of a bookmark, browsing history entry, and a shortcut on a new tab page.

17. The method of claim 9, wherein launching the application on the user's computing device to open the document corresponding to the navigated-to-document URL includes opening a byte-stream from the application to the document.

18. The method of claim 9, wherein launching the application on the user's computing device to open the document corresponding to the navigated-to-document URL includes retrieving, by the application, a previously cached version of the document.

19. A non-transitory computer-readable storage medium having instructions stored thereon, which instructions when executed by one or more microprocessors cause a user's computing device to:
    register a capability of a first application installed on the user's computing device to process document URLs of a specific type, the first application configured for native operation outside of a web browser on the user's computing device, wherein the web browser on a user's computing device tracks a declaration of a document URL type in a manifest of the first application of the capability of the first application to open a document corresponding to a document URL which conforms to the declared document URL type, and
    wherein the web browser maintains a registry of document URL types associated with applications including the first application installed on the user's computing device, the document URL types representing types of document URLs that the applications are coded to open or process, the registry of document URLs types being maintained as a table of the declared document URL types registered by the applications;
    when a navigation event on the user's computing device leads to a navigated-to-document URL that is of the specific type of document URLs registered to the first application on the user's computing device,
    present a selection dialog permitting the user to select whether the first application should be launched outside the web browser to process the navigated-to-document URL to open the document; and
    based on the user selection in the selection dialog, redirect the navigated-to-document URL to the first application and
    launch the application on the user's computing device to open the document corresponding to the navigated-to-document URL by one of using the navigated-to-document URL redirected to the first application to extract the document from the navigated-to-document URL and using the redirected URL as a unique ID to extract the document from a local cache.

20. The non-transitory computer-readable storage medium of claim 19, wherein the user's computing device on which the application is installed includes a web-based operating system.

21. The non-transitory computer-readable storage medium of claim 19, wherein the instructions when executed by one or more microprocessors cause the user's computing device to:
    recognize a rule identifying the specific type of the document URLs in a manifest file of the application.

22. The non-transitory computer-readable storage medium of claim 19, wherein the instructions when executed by one or more microprocessors cause the user's computing device to:
    recognize the specific type of the document URLs as a URL glob pattern.

23. The non-transitory computer-readable storage medium of claim 22, wherein the URL glob pattern includes only "http://" and/or "https://" URL schemes.

24. The non-transitory computer-readable storage medium of claim 19, wherein the instructions when executed by one or more microprocessors cause a web browser to keep track of the specific URL pattern types registered by all applications installed on the user's computing device.

25. The non-transitory computer-readable storage medium of claim 19, wherein the navigation event is one of a direct click by a user on a link in a web page or other document, and a script-driven navigation event.

26. The non-transitory computer-readable storage medium of claim 19, wherein a source of the navigation event is a one of a bookmark, browsing history entry, and a shortcut on a new tab page.

27. The non-transitory computer-readable storage medium of claim 19, wherein the instructions when executed by one or more microprocessors cause the application on the user's computing device to open a byte-stream from the application to the document corresponding to the navigated-to-document URL.

28. The non-transitory computer-readable storage medium of claim 19, wherein the instructions when executed by one or more microprocessors cause the application on the user's computing device to retrieve a previously cached version of the document.

* * * * *